United States Patent
Asche et al.

(10) Patent No.: US 6,223,807 B1
(45) Date of Patent: May 1, 2001

(54) HEATING, VENTILATING AND AIR CONDITIONING SYSTEM FOR A SKID STEER LOADER

(75) Inventors: James E. Asche, Milnor; Jeffrey A. Dahl, Lisbon; Laura A. Marstad, Fargo, all of ND (US); Jeffrey A. Abel, Fairmont, MN (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/350,500

(22) Filed: Jul. 9, 1999

(51) Int. Cl.$^7$ .................................. B61D 27/00
(52) U.S. Cl. ............... 165/43; 454/156; 180/68.4; 180/89.12; 123/41.49; 296/190.09
(58) Field of Search .................. 165/41, 42, 43; 62/244; 454/156; 123/41.49; 296/190.08, 190.09; 180/68.1, 68.3, 68.4, 68.6, 69.21, 89.12, 89.13, 89.14, 900; 237/12.3 R, 12.3 A, 5

(56) References Cited

U.S. PATENT DOCUMENTS

| | | |
|---|---|---|
| 3,555,846 | 1/1971 | Harbeck et al. . |
| 3,844,202 * | 10/1974 | Ferguson ........................... 62/244 X |
| 3,908,900 | 9/1975 | Smith ................... 237/12.3 |
| 3,924,524 * | 12/1975 | Whisler . |
| 4,072,487 | 2/1978 | Irwin ....................... 62/244 |
| 4,098,093 * | 7/1978 | Czyl ................... 62/244 X |
| 4,120,527 * | 10/1978 | Lawrence . |
| 4,344,356 | 8/1982 | Casterton et al. . |
| 4,352,456 * | 10/1982 | Brandenburg, Jr. ............. 237/12.3 R |
| 4,365,541 | 12/1982 | Marques et al. . |
| 4,612,975 | 9/1986 | Ikari ........................ 165/43 |
| 4,815,550 | 3/1989 | Mather et al. ................... 180/68.1 |
| 4,874,036 | 10/1989 | Masuda ................... 165/42 |
| 4,989,500 | 2/1991 | Anliker et al. . |
| 5,308,279 | 5/1994 | Grinberg ............................ 454/139 |
| 5,857,350 | 1/1999 | Johnson et al. ................. 62/314 |
| 5,906,411 * | 5/1999 | Stauffer et al. ............. 296/190.09 X |
| 5,911,624 | 6/1999 | Stauffer ........................ 454/158 |

FOREIGN PATENT DOCUMENTS

| | | |
|---|---|---|
| 0 125 620 | 11/1984 | (EP) . |
| 1411162 A1 * | 7/1988 | (SU) ..................... 237/12.3 A |

* cited by examiner

Primary Examiner—Ira S. Lazarus
Assistant Examiner—Ljiljana V. Ciric
(74) Attorney, Agent, or Firm—Westman, Champlin & Kelly, P.A.

(57) ABSTRACT

An air handling system for the cab of a skid steer loader has an airflow housing mounted on the exterior of the cab and on a rear wall thereof. The housing is within the profile of the loader, that is, below the upper wall of the cab and within the side frame members. The housing has an air inlet above the engine compartment, and includes a heater core and an air conditioning evaporator, both of which act as heat exchangers mounted in a plenum chamber in which two fans are mounted. Ducts lead from the plenum chamber to the interior of the cab. The ducts connected to the air handling housing open through ports in the rear wall of the cab into the interior, and interior or the cab ducts carry the air from the plenum chamber to desired locations of the operator's cab for heating, air conditioning or ventilating.

15 Claims, 5 Drawing Sheets

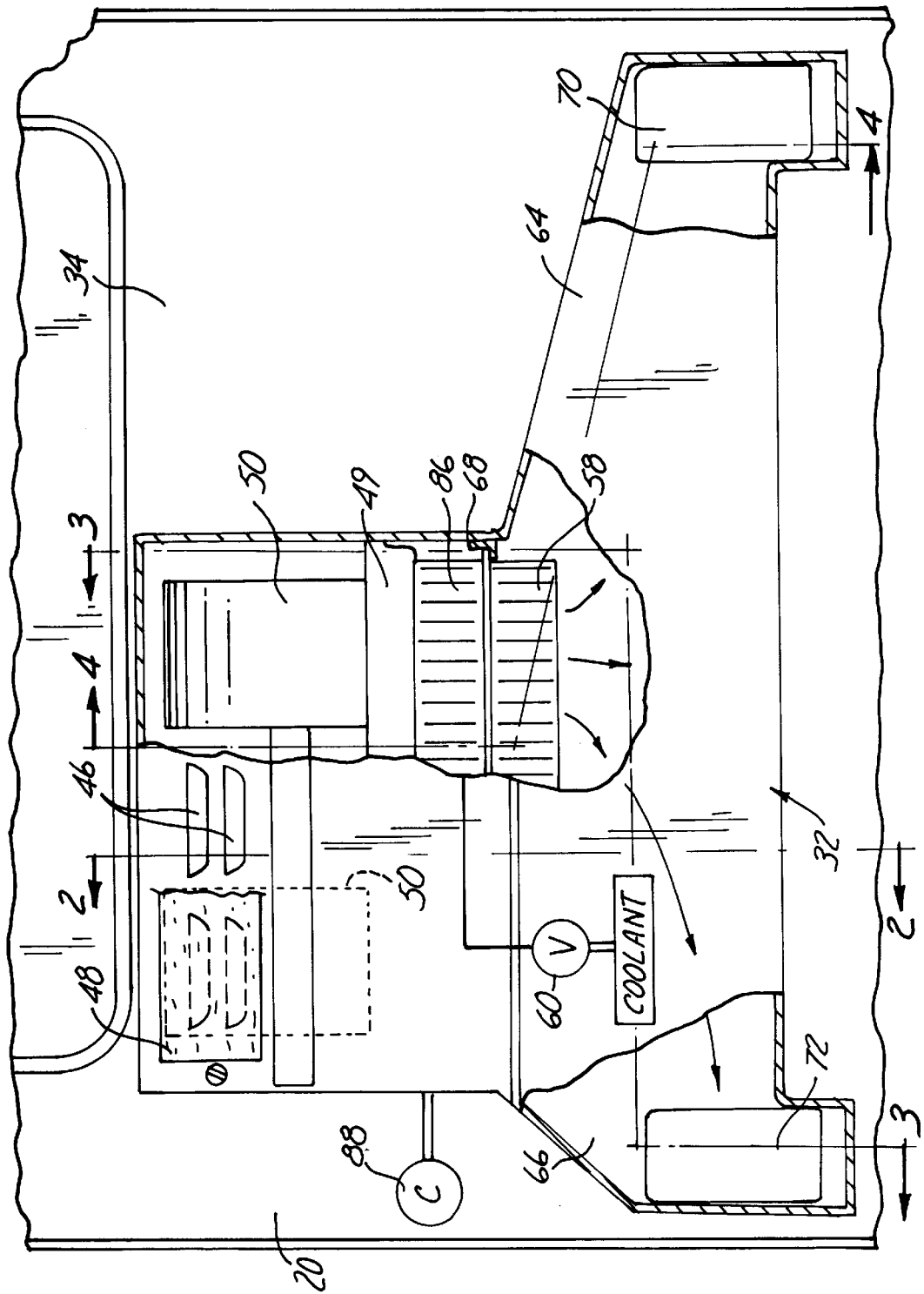

HEATING, VENTILATING AND AIR CONDITIONING SYSTEM FOR A SKID STEER LOADER

BACKGROUND OF THE INVENTION

The present invention relates to the mounting and positioning of a heating, ventilating and air conditioning system (HVAC) and associated duct work for a skid steer loader accommodating the major components of the HVAC system on the exterior of the loader cab. The heated or cooled air is discharged directly into the cab. The components are positioned out of the way at the rear of the cab, out of the major flow of dust and debris, and yet within the normal skid steer loader profile.

Skid steer loaders are very compact loaders, and it is desirable to keep the profile, i.e. height, width and length outside dimensions, the same, with or without the HVAC system for each model. The HVAC system of the present invention is thus inside the frame structure which also provides protection from damage.

In the past, many of the skid steer loaders had open operator compartments which did not need air conditioning or heating. More recently, enclosed cabs with both heating and air conditioning are sold but the problem of placement of the compressor, condenser, evaporator, heater core and blower or fan within the existing profile of the skid steer loader has existed.

Condensers, evaporators and heater cores have been placed under the operator seats on loaders, where space is severely restricted, and also have been placed on the top of cabs of loaders. The placement on the top of the cab puts the condenser, fan and other components in a location where they may be damaged when the loader is being used. Locating components where they are out-of-the-way and protected without enlarging the loader profile or outer dimensions is desirable.

SUMMARY OF THE INVENTION

The present invention relates to heating, ventilating and air conditioning (HVAC) system for a skid steer loader that utilizes existing space for mounting the major components such as an evaporator, a heater core and a fan in an out of the way location where the components are protected from damage and are easily ducted into the cab enclosure. The components are all mounted on the exterior of the cab at the rear and adjacent the engine compartment with the ambient air inlet above the engine compartment. The components thus are kept out of the operator compartment or cab space, and they do not extend beyond the frame or cab profile in either lateral or vertical directions. Further, the components are located so that the ducting for airflow is short and the heated or cooled air will be delivered into the cab easily. The overall cost of the system is reduced as well because there is no need for long ducts.

The compressor, condenser, fan, evaporator and heater core can be conventional units. They may be located in a desired position.

In addition, a fresh air filter is utilized on the fresh air intake at the exterior of the HVAC housing, to aid in keeping the air taken into the operator cab clean and free of substantial amounts of dust and debris.

The present invention places the evaporator, heater core, fan and ducts in a place where they can be serviced easily, and are protected, but do not fill the operator's cab with equipment, nor do they use long duct work for transferring heated or cooled air into the interior of the cab.

BRIEF DESCRIPTION OF THE DRAWINGS

FIG. 5 is a rear view cut away of the HVAC system showing a laterally extending ducts leading into the interior of the cab with parts in section and parts broken away.

DETAILED DESCRIPTION OF THE ILLUSTRATIVE EMBODIMENTS

Figure 1:
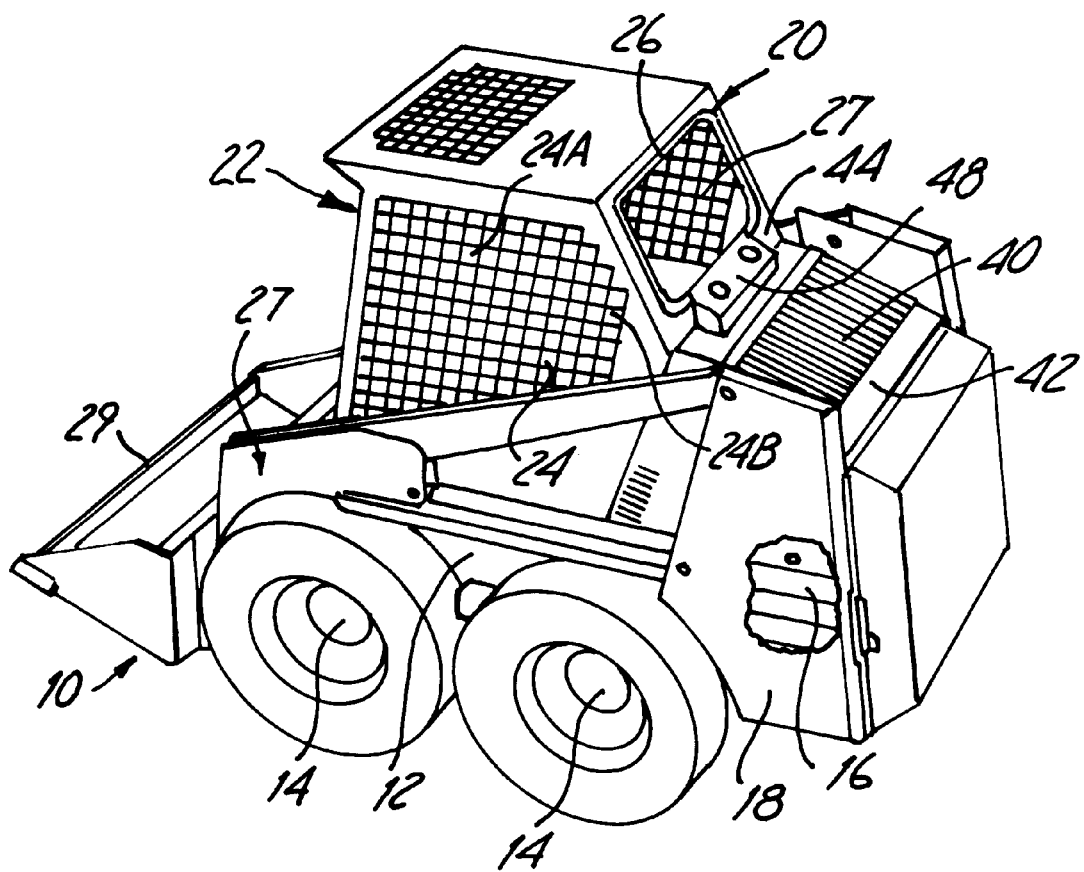
FIG. 1 is a schematic perspective view of a skid steer loader having a heating, ventilating and air conditioning system (HVAC) made according to the present invention installed thereon.

A skid steer loader 10 is of conventional design and includes a frame 12, mounted on wheels 14 that are driven through a suitable power train, such as hydraulic motors that are driven in turn from pumps. The pumps are driven by an engine 16 mounted in an engine compartment 18 that is to the rear of the operator's cab or enclosure 20. In the form of the invention shown, the operator's cab is made with a door 22, and side windows 24 so that the cab is enclosed. The cab 20 can include a suitable roll over protection frame work 26, and open mesh metal side plates over the windows. The cab 20 can thus be enclosed, and in order to provide heating, ventilating and air conditioning, an HVAC system housing indicated generally at 32 (FIGS. 2–5) is installed along the back wall 34 of the operator's cab 20, and under an offset wall 36 of the cab that overlies a portion of the engine compartment 18. The loader has pivoting arms 27 that can be raised and lowered under power. A loader bucket or other tool 29 is supported by the arms 27.

In a normal engine and oil cooling system of the skid steer loader, as shown in U.S. Pat. No. 4,815,550, intake air that is used for cooling the engine radiator, and oil cooler, and moving air through the engine compartment and discharged, is taken in through a large opening 40 in the top wall 42 of the engine compartment 18 (FIG. 1). This engine cooling air intake is adjacent to a wall 44 forming a part of a plenum chamber 49 for the HVAC system. The wall 44 has louvers 46 and an intake air filter 48 of suitable design is mounted over the louvers, such as with quick remove bolts or the like, so that air passing through the openings associated with louvers 46 will be filtered before it enters into a plenum chamber 49 in which one or more squirrel cage fans 50 are mounted. There are two fans 50, as shown. The plenum chamber 49 has outlet ducts so that the air from the fans 50, which are individually or tandemly driven with a suitable motor shown at 52 from the electrical system of the skid steer loader, will draw in air through the filter 48 and louvers 46, and also will recirculate part of the air through openings 54 in the wall 56 that forms a horizontal shelf at the rear of the operator's cab.

The air from the plenum chamber 49 is then discharged through an air conditioning system evaporator 58 that provides cooling and a heater core 86 of conventional design, which carries hot coolant from the engine. When the airflow from the fan 50 passes through the heater core, it will be warmed and heated, when the heater valve 60 is on.

The heated air, and as will be explained, cooled air when the air conditioning is being used, will pass into a pair of ducts, shown in FIG. 5, including a laterally extending duct 64 that extends to the right-hand side of the operator's cab, and a shorter left-hand extending duct 66 that will go onto the left side of the cab. It can be seen that the HVAC system is offset from the center of the cab. The ducts 64 and 66, which are hollow to permit air to flow through, will carry a sufficient volume of air to both sides of the cab.

As can be seen in FIG. 5, there are two of the squirrel cage fans 50 in the plenum chamber 49, and the plenum chamber has a lower wall 68 that will direct the air through the evaporator 58 and heater core 86.

Figure 2:
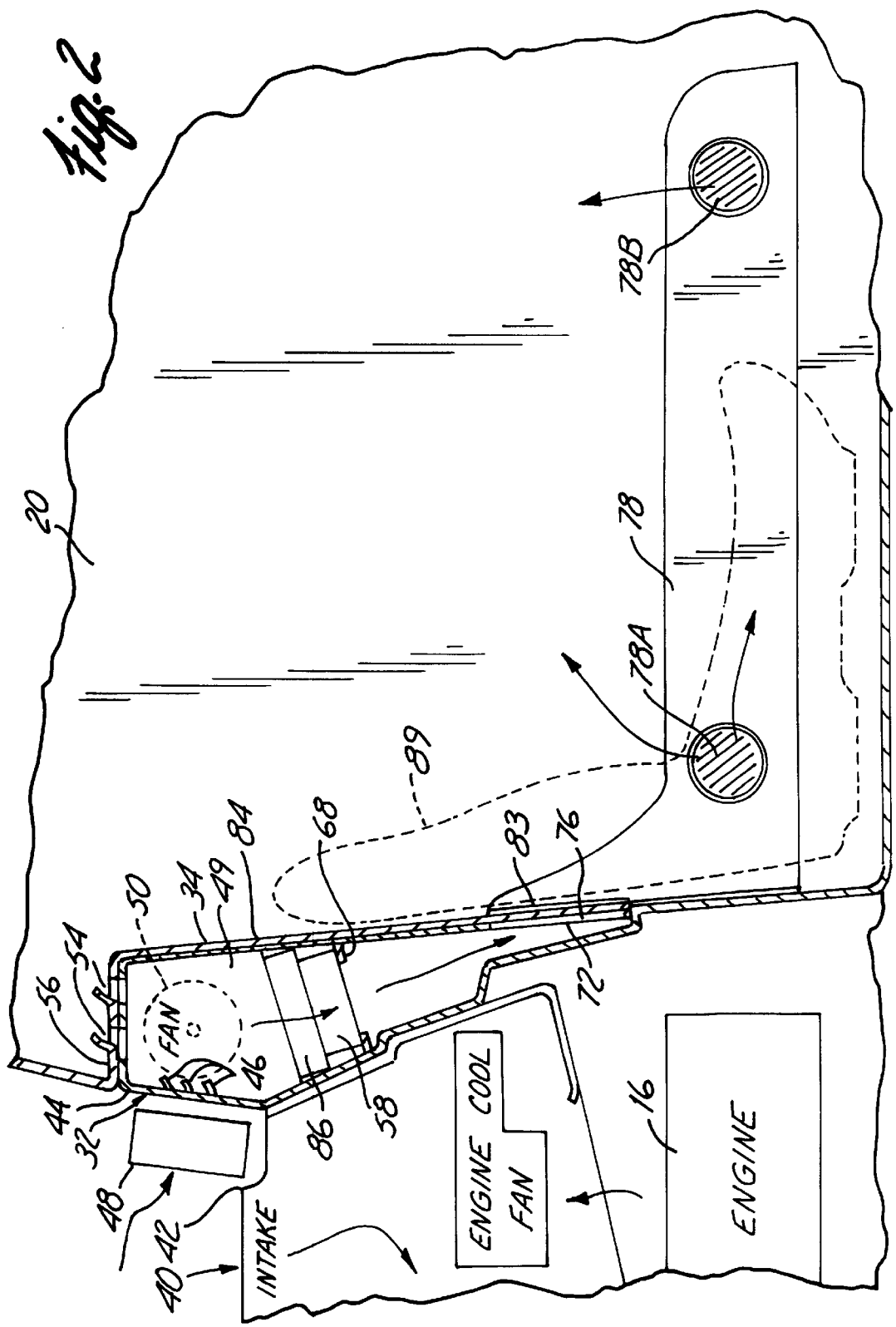
FIG. 2 is a side sectional view of a typical skid steer loader showing the HVAC system installed thereon; and taken generally on line 2—2 in FIG. 5
Figure 3:
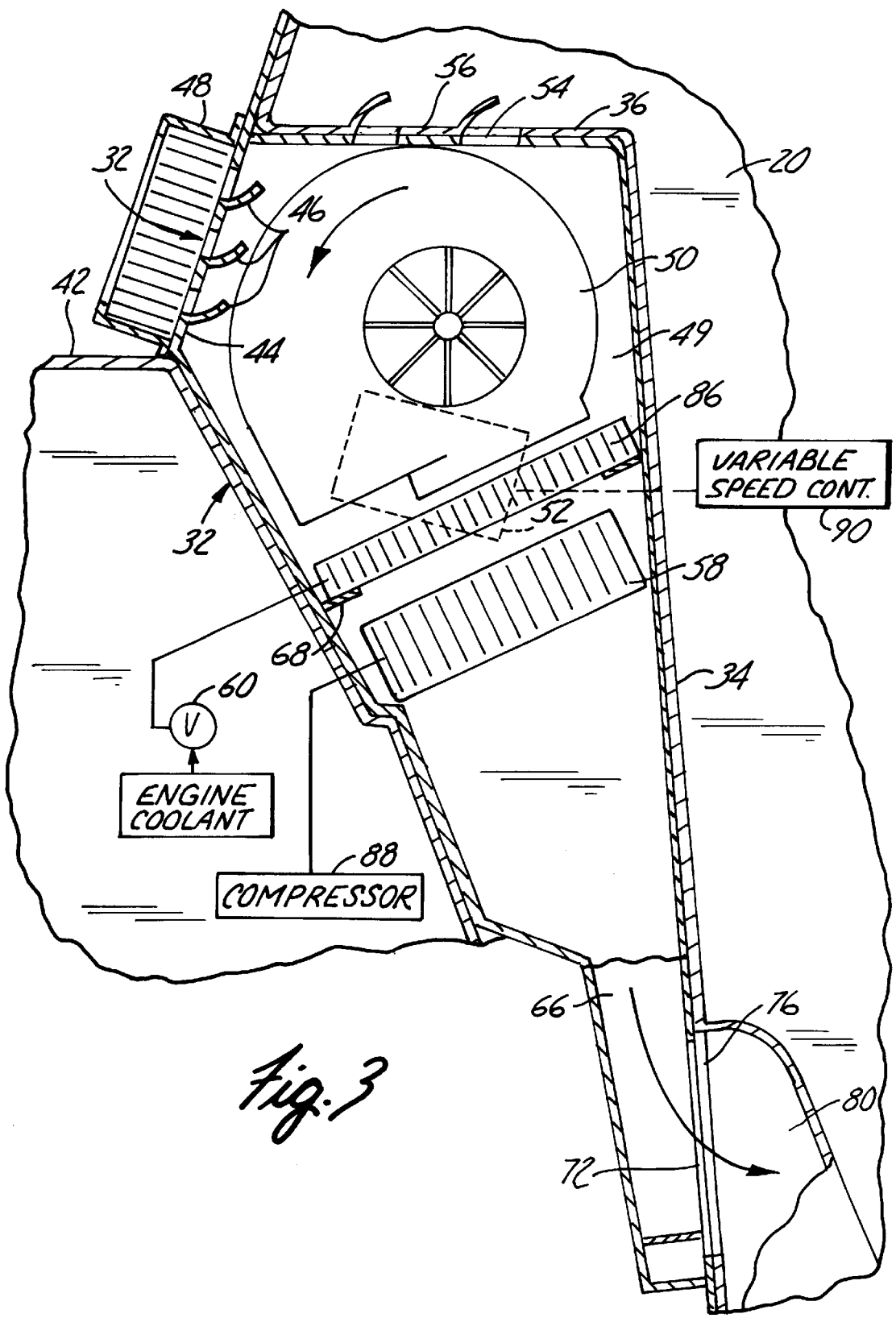
FIG. 3 is an enlarged side sectional view similar to FIG. 2, and taken generally along line 3—3 in FIG. 5.
Figure 4:
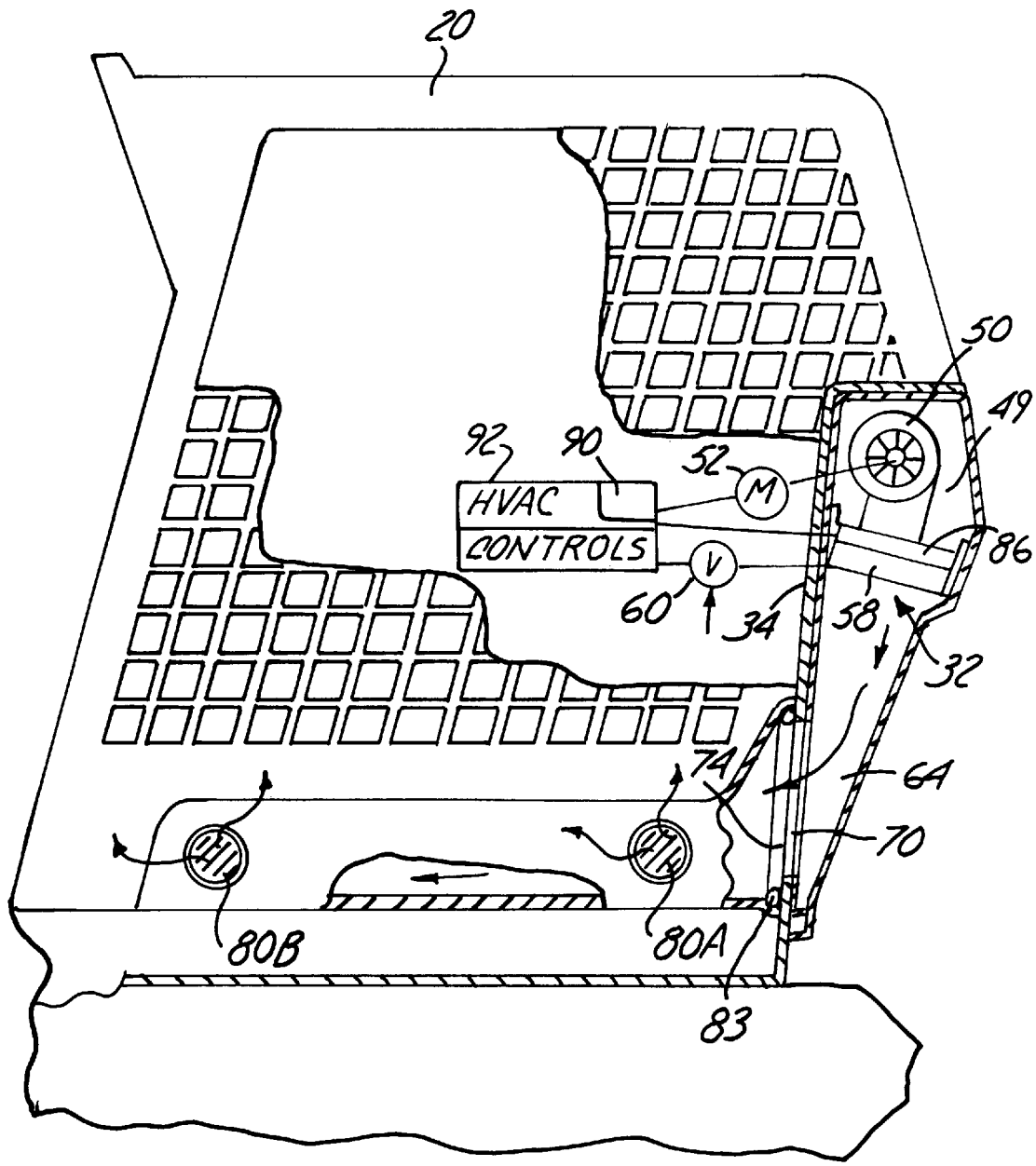
FIG. 4 is a vertical sectional view through an operator's compartment viewed from an opposite side from FIG. 3 and showing side duct work along one side of the cab and taken generally along line 4—4 in FIG. 5.

The ducts 64 and 66 each have outlet ports shown at 70 and 72, respectively, that align with openings or ports 74 and 76 through the rear wall 34 of the cab. These ports 74 and 76 open into ducts on opposite sides of the interior of the cab. A duct 80 is on the right-hand side of the cab (FIG. 4), and a duct 78 is on the left-hand side of the cab (FIG. 2). These ducts carry the heated or cooled (or ventilating) airflow and discharge it through suitable ports, as shown ports positioned adjacent the rear of the cab and indicated at 78A and 80A, to direct air upwardly toward an operator that is seated in the seat that is outlined in dotted lines at 89. Second ports 78B and 80B are near the forward side of the cab. As can be seen, the interior ducts pass along the side of the cab at about the level of the operator's seat, so that the air is directed onto the operator. The ports 78A, 80A and 78B, 80B can have adjustable louvers in a conventional manner, such as those used for automobile air conditioning and heating ducts.

Suitable gaskets such as foam gaskets 83 can be used between the ends of the ducts 78 and 80 and wall 34, and also if needed between ducts 64 and 66 and the exterior of the back wall 34 of the cab.

Referring again to FIGS. 3 and 5, it can be seen that the air conditioning evaporator or heat exchanger 58 is mounted immediately below the heater core 86, so that when the heater is shut off and cooling is wanted, an air conditioner compressor 88 would be started or engaged, and the evaporator 86 would carry refrigerated gas, so that air passing from the fans 50 will be cooled and then discharged through the ducts 64 and 66 and out the ports 70 and 72 into the cab interior ducts 78 and 80.

The air conditioning compressor 88 can be of any conventional design and is driven by the engine 18 of the skid steer loader. The control for engaging the compressor usually involves engaging an electric clutch.

It thus can be seen that the HVAC housing 32 including the stacked heater core 86 and air conditioning evaporator 58 is mounted on the rear wall 34 of the cab where the components are out of the way and out of view. The arrangement provides a compact unit, with very specific airflow paths into the cab along the lateral sides. The louvers are located also to direct the air, either heated or cooled, onto the operator and along the legs of the operator up near where the knees would be, onto the operator's feed and onto the cab door for defrost, with the outlet ports 78B and 80B.

The air intake for fresh air, through the filter 48 is up away from the ground, yet below the top of the cab so that it will not expand the cab profile, or increase its height and also as can be seen the entire unit is within the side frame members of the cab for protection.

The fans 50 can be controlled with suitable controls as illustrated at 90, for regulating the fan speed. Normal air conditioner and heater controls 92 for temperature control will be provided. The compressor for the air conditioner will be driven from the skid steer loader engine. The fans 50 can be run without either heat or cooling, to circulate fresh air through the cab.

The HVAC housing 32 forming the plenum chamber 49 and the ducts 64 and 66 will be termed an air handling unit or a ventilation assembly which means it can be used for ventilation only with fresh ambient air. Heated air from the heat exchanger, or cool air from the evaporator or cold air heat exchanger, or combinations of ventilation with heat or cooling can be accommodated.

Although the present invention has been described with reference to preferred embodiments, workers skilled in the art will recognize that changes may be made in form and detail without departing from the spirit and scope of the invention.

What is claimed is:

1. In a skid steer loader having a frame, an engine compartment at a rear of the frame, an operator's cab at a front portion of the frame extending upwardly from the engine compartment and having a front and a rear wall, and a loader bucket mounted on arms for up and down movement at a front end of the skid steer loader, the improvement comprising a ventilation assembly including a housing at least partially between the rear wall of the cab and the engine compartment, the housing forming a plenum chamber; a fan in the plenum chamber; at least one of a heater core and an air conditioning evaporator mounted in the plenum chamber; at least one duct connected to carry air from the plenum chamber to lower portions of an interior of the cab; the fan being oriented to direct air through said at least one of the heater core and the air conditioning evaporator, and through said at least one duct to the interior of the cab; the housing, said at least one of the heater core and air conditioning evaporator, and said at least one duct being mounted on the rear of, and on the exterior of, the cab, and an ambient air inlet to the plenum chamber located above the engine compartment.

2. The improvement of claim 1, wherein the plenum chamber is at an upper end of the housing.

3. The improvement of claim 2, wherein the plenum chamber inlet has a filter covering the inlet to filter the ambient air entering the plenum chamber.

4. The improvement of claim 1, wherein there is a second fan in the plenum chamber, and two ducts leading from the plenum chamber to the interior of the cab, said ducts opening into the cab through the rear wall of the cab.

5. The apparatus of claim 2, wherein the inlet for the plenum chamber is above the engine compartment of the skid steer loader and below an upper wall of the cab.

6. The improvement of claim 1, wherein the rear wall of said cab has a horizontally offset section, and an opening leading to the plenum chamber through the offset section for providing recirculation of air from the interior of the cab into the plenum chamber.

7. In combination with a skid steer loader having a frame, a working tool at a forward end of said frame, an engine compartment at a rear of the frame, and an operator's cab ahead of the engine compartment and having a rear wall, a top wall, and a forward facing end forming an interior of the cab, the improvement comprising an air handling unit for circulating air under controlled conditions into the interior of the cab, the air handling unit including an air handling housing mounted on the rear wall of the cab on the exterior thereof at a location below the top wall, and having at least an air inlet into the housing, the air inlet being above the engine compartment.

8. The combination of claim 7, wherein the air handling housing includes at least one port opening through the rear wall into the interior of the cab.

9. The combination of claim 8, wherein the air handling housing defines a plenum chamber and an exterior duct leading from the plenum chamber formed by the air handling unit into the interior of the cab, a fan in the plenum chamber, and at least one heat exchange component mounted between the plenum chamber and the duct.

10. The combination of claim 9, wherein there is a second exterior duct leading from the plenum chamber to the rear wall of the cab, said exterior ducts being on opposite lateral sides of the housing and leading to two laterally spaced ports in the rear wall of the cab, and wherein the combination further includes two interior ducts communicating with the two ports and the exterior ducts, respectively, said two interior ducts being positioned along opposite side walls of the cab and each having outlet ports discharging air from the plenum chamber into the cab.

11. The combination of claim 9 including an air inlet to the plenum chamber opening to the interior of the cab in addition to the exterior opening.

12. The combination of claim 11, wherein at least a portion of the plenum chamber is above the engine compartment.

13. The combination of claim 7, wherein the plenum chamber houses a first heat exchanger for providing heated air to the cab and a second heat exchanger for providing cooled air to the cab.

14. In combination with a skid steer loader having a frame, a working tool at a forward end of said frame, an engine compartment at a rear of the frame, and an operator's cab ahead of the engine compartment and having a rear wall, a top wall, and a forward facing end forming an interior of the cab, the improvement comprising an air handling unit for circulating air under controlled conditions into the interior of the cab, the air handling unit including an air handling housing mounted on the rear wall of the cab on an exterior thereof at a location below the top wall, the air handling housing defining a plenum chamber and having an air inlet into the housing and at least one port opening through the rear wall into the interior of the cab, the air inlet being above the engine compartment, an exterior duct leading from the plenum chamber formed by the air handling unit to said at least one port, a fan in the plenum chamber, at least one heat exchange component mounted between the plenum chamber and the duct, and air handling unit further including an interior duct mounted on the interior of the cab, the interior duct communicating with the port in the rear wall of the cab and extending forwardly along a side wall of the cab, and at least two outlets leading from the interior duct at spaced locations in a fore and aft direction to direct air at desired locations relative to an operator's seat in the cab.

15. In combination with a skid steer loader having a frame, a working tool at a forward end of said frame, an engine compartment at a rear of the frame, and an operator's cab ahead of the engine compartment and having a rear wall, a top wall, and a forward facing end forming an interior of the cab, the improvement comprising an air handling unit for circulating air under controlled conditions into the interior of the cab; the air handling unit including an air handling housing mounted on the rear wall of the cab on the exterior thereof at a location below the top wall, and having at least an air inlet into the housing, the air inlet being above the engine compartment; a pair of laterally extending ducts leading from the housing and aligning with separate ports in the rear wall of the cab; and a separate fan to direct air to each of the respective ducts.

* * * * *

UNITED STATES PATENT AND TRADEMARK OFFICE
CERTIFICATE OF CORRECTION

PATENT NO.    : 6,223,807 B1
DATED         : May 1, 2001
INVENTOR(S)   : James E. Asche et al.

It is certified that error appears in the above-identified patent and that said Letters Patent is hereby corrected as shown below:

<u>Title page,</u>
Item [57], ABSTRACT,
Line 12, after "interior" (first occurrence) insert -- of the cab --; and delete "or the cab".

<u>Column 2,</u>
Line 7, delete ";".
Line 8, after "FIG. 5" insert -- ; --.
Line 15, delete "view"; and after "cut away" insert -- view --.

Please cancel claim 5.

Signed and Sealed this

Second Day of April, 2002

*Attest:*

JAMES E. ROGAN
*Attesting Officer*   *Director of the United States Patent and Trademark Office*